H. DEAN.
SECONDARY ELECTRIC BATTERY OR ACCUMULATOR.
APPLICATION FILED SEPT. 30, 1921.

1,426,966. Patented Aug. 22, 1922.

INVENTOR
Herbert Dean
BY
Augustus B. Stoughton
ATTORNEY.

WITNESS:

UNITED STATES PATENT OFFICE.

HERBERT DEAN, OF CLIFTON JUNCTION, NEAR MANCHESTER, ENGLAND, ASSIGNOR TO THE ELECTRIC STORAGE BATTERY COMPANY, OF PHILADELPHIA, PENNSYLVANIA, A CORPORATION OF NEW JERSEY.

SECONDARY ELECTRIC BATTERY OR ACCUMULATOR.

1,426,966.          Specification of Letters Patent.     Patented Aug. 22, 1922.

Application filed September 30, 1921. Serial No. 504,440.

*To all whom it may concern:*

Be it known that I, HERBERT DEAN, a subject of the King of England, residing at Clifton Junction, near Manchester, England, have invented certain new and useful Improvements relating to Secondary Electric Batteries or Accumulators, of which the following is a specification.

This invention relates to secondary electric batteries or accumulators and has for its object to provide a simple and effective combination of parts for preventing spilling of the electrolyte through the vent aperture.

The invention comprises the combination with a chamber around the vent tube, of two straight tubes extending into a compartment in the accumulator top, one of said tubes opening adjacent the bottom of the chamber and the other extending through the latter into the accumulator.

Referring to the accompanying sheet of explanatory drawings

Figure 1:
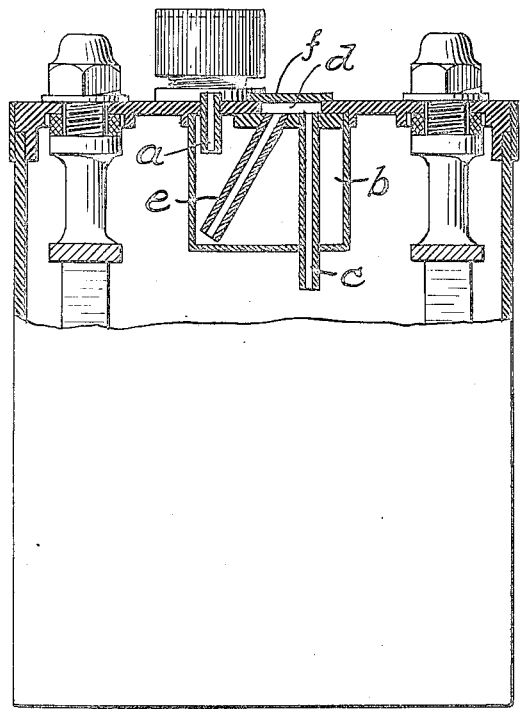

Figure 1 is a part sectional front elevation.

Figure 2:
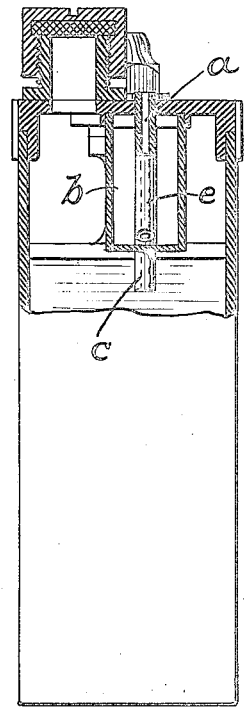

Fig. 2 a part sectional end elevation, and

Figure 3:
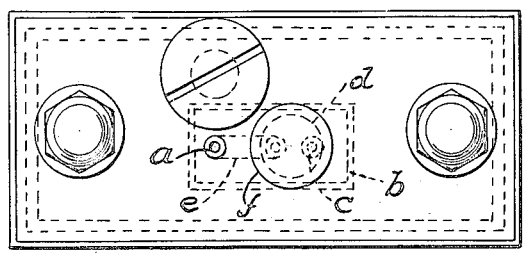

Fig. 3 a plan view of a secondary electric battery or accumulator having my invention applied thereto in one convenient form.

The same reference letters in the three views indicate the same parts.

The ordinary vent tube $a$ extends into a chamber $b$ secured upon the accumulator top. The tube $c$ extends from the accumulator into a space $d$ formed in the top of the accumulator and a further tube $e$ extends from said space to the lower part of the chamber $b$. The space $d$ may be closed by a cap $f$ which may be detachably mounted in the top by screwing or otherwise or be secured thereon by burning or otherwise.

The tubes $c$ and $e$ are straight tubes so that should any obstruction occur therein, they can be readily cleared by removing the cap $f$. The tube $a$ is also a straight tube and can be readily cleared of any obstruction.

When the accumulator is being charged, any electrolyte which is carried into the space $d$ and chamber $b$, due to the heating up of the electrolyte and the consequent expulsion of air from the accumulator, will on the cooling down of the electrolyte be drawn back into the accumulator through the tubes $e$ and $c$, the former drawing the liquor off the bottom of the chamber $b$.

I do not limit myself to any particular form of the chamber $b$ or of the cap $f$ but may modify the same to suit any particular requirements.

It will be obvious to those skilled in the art to which the invention relates that modifications may be made in details of construction and arrangement without departing from the spirit thereof, hence the invention is not limited to those matters or otherwise than as the prior art and the appended claim may require.

I claim:

In secondary electric batteries or accumulators having a vent tube, the combination with a chamber arranged around the vent tube and provided with a compartment having a capped opening through the top accumulator wall, of two straight tubes extending into said compartment so that by removing the cap from the said compartment, the said tubes can be readily cleared of any obstruction and one of said tubes opening adjacent the bottom of the chamber and the other extending through the latter into the accumulator, substantially as described.

HERBERT DEAN.